United States Patent
Taherzadeh Boroujeni et al.

(10) Patent No.: US 11,743,948 B2
(45) Date of Patent: Aug. 29, 2023

(54) SRS TRANSMITTED WITH MSG4 ACK

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 17/150,885

(22) Filed: Jan. 15, 2021

(65) Prior Publication Data

US 2022/0124811 A1    Apr. 21, 2022

Related U.S. Application Data

(60) Provisional application No. 63/092,891, filed on Oct. 16, 2020.

(51) Int. Cl.
| | | |
|---|---|---|
| *H04W 4/00* | (2018.01) | |
| *H04W 74/08* | (2009.01) | |
| *H04L 5/00* | (2006.01) | |
| *H04W 24/08* | (2009.01) | |
| *H04W 72/1268* | (2023.01) | |

(52) U.S. Cl.
CPC ....... *H04W 74/0833* (2013.01); *H04L 5/0007* (2013.01); *H04L 5/0048* (2013.01); *H04W 24/08* (2013.01); *H04W 72/1268* (2013.01)

(58) Field of Classification Search
CPC ............. H04W 74/0833; H04W 24/08; H04W 72/1268; H04L 5/0007; H04L 5/0048; H04L 5/0064; H04L 5/0055; H04L 5/0091; H04L 5/001; H04L 5/0023

USPC .......................................................... 370/329
See application file for complete search history.

(56) References Cited

U.S. PATENT DOCUMENTS

| | | | | |
|---|---|---|---|---|
| 2018/0310257 A1* | 10/2018 | Papasakellariou | .... | H04W 52/36 |
| 2019/0141773 A1* | 5/2019 | Kim | ...................... | H04W 76/34 |
| 2021/0409171 A1* | 12/2021 | Henttonen | ............ | H04W 76/27 |
| 2022/0086899 A1* | 3/2022 | Shih | ...................... | H04L 5/0053 |

FOREIGN PATENT DOCUMENTS

| | | |
|---|---|---|
| WO | 2018022782 A1 | 2/2018 |
| WO | WO-2020170352 A1 * | 8/2020 |
| WO | WO-2022078763 A1 * | 4/2022 |

OTHER PUBLICATIONS

International Search Report and Written Opinion—PCT/US2021/051152—ISA/EPO—dated Jan. 18, 2022.

\* cited by examiner

*Primary Examiner* — Maharishi V Khirodhar
(74) *Attorney, Agent, or Firm* — Patterson + Sheridan, L.L.P.

(57) ABSTRACT

Certain aspects of the present disclosure provide techniques for transmitting sounding reference signals (SRS) with (e.g., before or after) a random access channel (RACH) acknowledgement (ACK) (e.g., after Msg4). An example method by a user equipment (UE) includes receiving a first downlink RACH message, receiving a second downlink RACH message after the first downlink RACH message, receiving signaling that indicates the UE is to transmit SRS after the second downlink RACH message, and transmitting the SRS after the second downlink RACH message, in accordance with the indication.

20 Claims, 11 Drawing Sheets

SRS TRANSMITTED WITH MSG4 ACK

PRIORITY CLAIM(S)

This application claims benefit of the priority to U.S. Provisional Application No. 63/092,891, filed on Oct. 16, 2020, which is expressly incorporated by reference in its entirety as if fully set forth below and for all applicable purposes.

INTRODUCTION

Aspects of the present disclosure relate to wireless communications, and more particularly, to techniques for transmitting sounding reference signals (SRS).

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure may provide advantages, such as improved coverage enhancement for random access procedures.

Certain aspects provide a method for wireless communication by a user equipment (UE). The method includes receiving a first downlink random access channel (RACH) message, receiving a second downlink RACH message after the first downlink RACH message, receiving signaling that indicates the UE is to transmit sounding reference signals (SRS) after the second downlink RACH message, and transmitting the SRS after the second downlink RACH message, in accordance with the indication.

Certain aspects provide a method for wireless communication by a network entity. The method includes transmitting a first downlink RACH message to a UE, transmitting a second downlink RACH message to the UE after the first downlink RACH message, signaling the UE an indication that the UE is to transmit SRS after the second downlink RACH message, and monitoring for SRS transmissions from the UE after the second downlink RACH message, in accordance with the indication.

Certain aspects provide an apparatus for wireless communication by a user equipment (UE). The apparatus includes a memory and at least one processor coupled to the memory, the memory and the at least one processor being configured to receive a first downlink random access channel (RACH) message, receiving a second downlink RACH message after the first downlink RACH message, receive signaling that indicates the UE is to transmit sounding reference signals (SRS) after the second downlink RACH message, and transmit the SRS after the second downlink RACH message, in accordance with the indication.

Certain aspects provide an apparatus for wireless communication by a network entity. The apparatus includes a memory and at least one processor coupled to the memory, the memory and the at least one processor being configured to transmit a first downlink RACH message to a UE, transmit a second downlink RACH message to the UE after the first downlink RACH message, signal the UE an indication that the UE is to transmit SRS after the second downlink RACH message, and monitor for SRS transmissions from the UE after the second downlink RACH message, in accordance with the indication.

Certain aspects provide an apparatus for wireless communication by a user equipment (UE). The apparatus includes means for receiving a first downlink random access channel (RACH) message, means for receiving a second downlink RACH message after the first downlink RACH message, means for receiving signaling that indicates the UE is to transmit sounding reference signals (SRS) after the second downlink RACH message, and means for transmitting the SRS after the second downlink RACH message, in accordance with the indication.

Certain aspects provide an apparatus for wireless communication by a network entity. The method includes means for transmitting a first downlink RACH message to a UE, means for transmitting a second downlink RACH message to the UE after the first downlink RACH message, means for signaling the UE an indication that the UE is to transmit SRS after the second downlink RACH message, and means for monitoring for SRS transmissions from the UE after the second downlink RACH message, in accordance with the indication.

Certain aspects provide a computer readable medium having instructions stored thereon for wireless communication by a user equipment (UE). The instructions include instructions for receiving a first downlink random access channel (RACH) message, receiving a second downlink RACH message after the first downlink RACH message, receiving signaling that indicates the UE is to transmit sounding reference signals (SRS) after the second downlink RACH message, and transmitting the SRS after the second downlink RACH message, in accordance with the indication.

Certain aspects provide a computer readable medium having instructions stored thereon for wireless communication by a network entity. The instructions includes instructions for transmitting a first downlink RACH message to a UE, transmitting a second downlink RACH message to the UE after the first downlink RACH message, signaling the UE an indication that the UE is to transmit SRS after the second downlink RACH message, and monitoring for SRS transmissions from the UE after the second downlink RACH message, in accordance with the indication.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
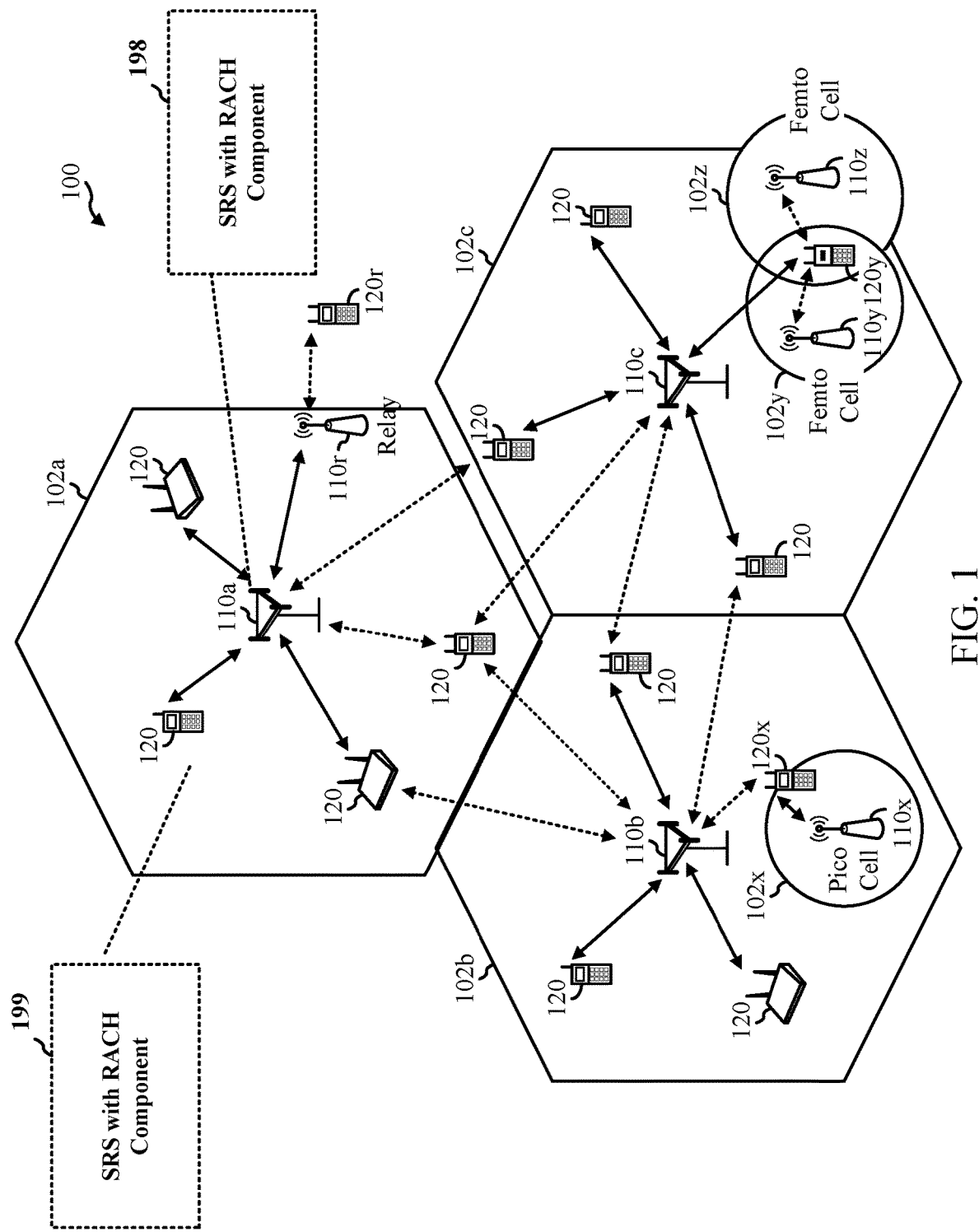
FIG. 1 is a block diagram conceptually illustrating an example telecommunications system, in accordance with certain aspects of the present disclosure.

Aspects of the present disclosure relate to wireless communications, in particular, provide techniques for transmitting sounding reference signals (SRS) with (e.g., before or after) a random access channel (RACH) acknowledgement (ACK). For example, the SRS may be indicated by a Msg2, Msg4, and/or a Msg4 physical downlink control channel for a 4-step RACH procedure (such as that shown in FIG. 4).

According to certain aspects, a RACH message (e.g., Msg 2, Msg 4, and/or Msg 4 PDCCH) may trigger a UE to send SRS. For example, such a RACH message may include an indication (e.g., via an SRS grant) for the UE to transmit the SRS. This may result in a UE transmitting SRS with (e.g., before or after) a Msg 4 ACK message.

SRS transmissions sent at this early stage, prior to radio resource control (RRC) connection establishment, may enhance performance and overall user experience. For example, SRS transmissions sent during the RACH procedure may help a gNB perform uplink timing tracking, beam management, and/or perform link adaptation during the RACH procedure. Performing these functions during the RACH procedure (rather than waiting until after RRC connection is established) may allow communications to be optimized sooner.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, a UE 120 may be configured with an SRS with RACH component 199 to perform operations 700 of FIG. 7 to transmit sounding reference signals (SRS) with (e.g., before or after) a random access channel (RACH) acknowledgement (ACK) (e.g., after Msg4), in accordance with various aspects discussed herein. Similarly, a base station 110 may be configured with an SRS with RACH component 198 to perform operations 800 of FIG. 8 to indicate to a UE (e.g., performing operations 700 of FIG. 7) to transmit SRS with (e.g., before or after) a RACH ACK (e.g., after Msg4) and to monitor for such SRS transmissions.

As illustrated in FIG. 1, the wireless communication network 100 may include a number of base stations (BSs) 110 and other network entities. ABS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
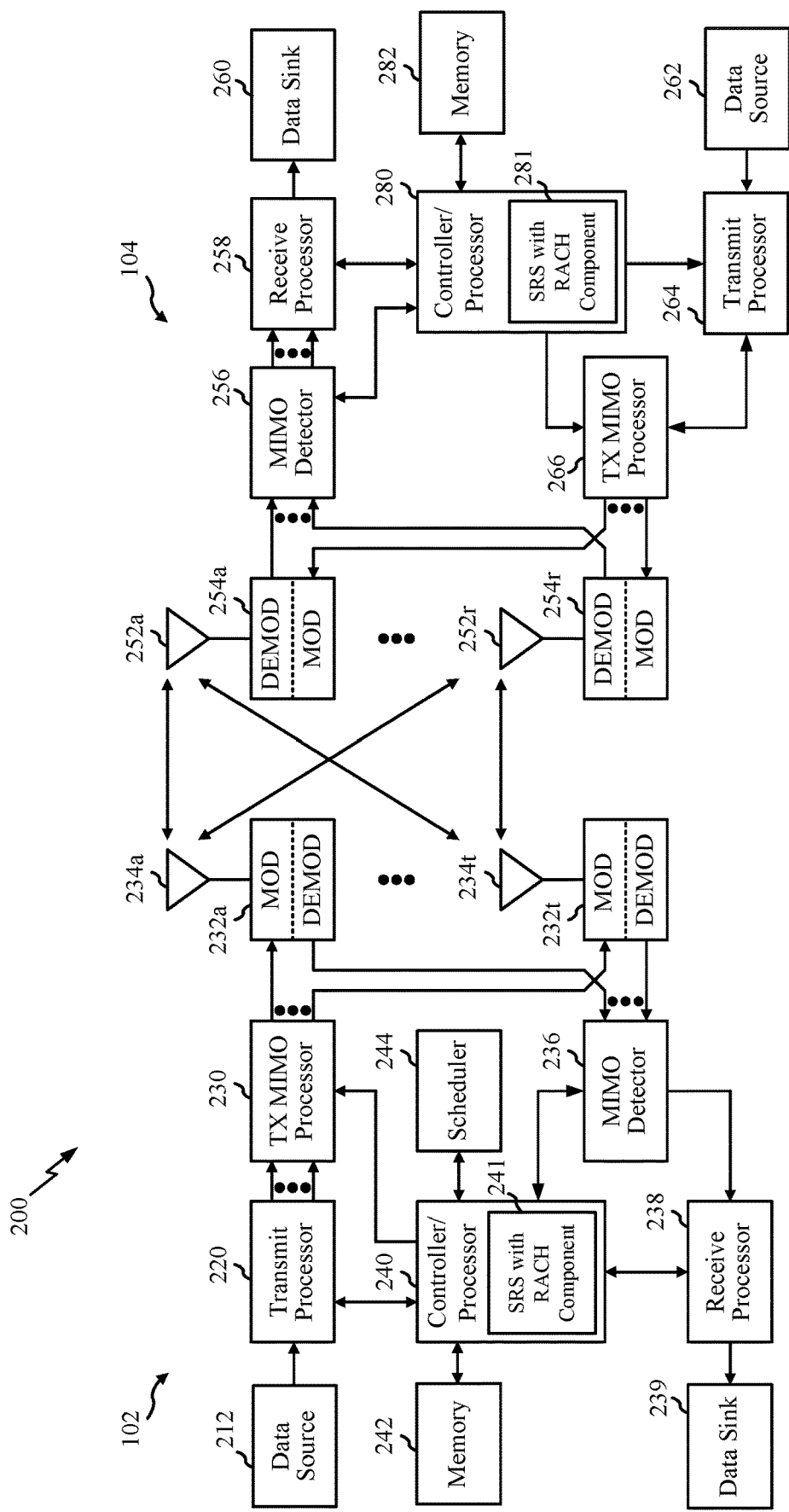
FIG. 2 is a block diagram conceptually illustrating a design of an example base station (BS) and user equipment (UE), in accordance with certain aspects of the present disclosure.

FIG. 2 depicts certain example aspects of a base station (BS) 102 and a user equipment (UE) 104. Generally, BS 102 includes various processors (e.g., 220, 230, 238, and 240), antennas 234a-t, transceivers 232a-t, and other aspects, in order to transmit data (e.g., source data 212) and to receive data (e.g., data sink 239). For example, BS 102 may send and receive data between itself and UE 104.

In the depicted example, BS 102 includes controller/processor 240, which comprises an SRS with RACH component 241. In some cases, the SRS with RACH component 241 may be configured to implement SRS with RACH component 199 of FIG. 1 and to perform the operations depicted and described with respect to FIG. 8.

UE 104 generally includes various processors (e.g., 258, 264, 266, and 280), antennas 252a-r, transceivers 254a-r, and other aspects, in order to transmit data (e.g., source data 262) and to receive data (e.g., data sink 260).

In the depicted example, UE 104 includes controller/processor 280, which comprises an SRS with RACH component 281. In some cases, the SRS with RACH component 281 may be configured to implement the SRS with RACH component 198 of FIG. 1 and to perform the operations depicted and described with respect to FIG. 7.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

Antennas 252, processors 266, 258, 264, and/or controller/processor 280 of UE 104 and/or antennas 234, processors 220, 230, 238, and/or controller/processor 240 of BS 102 may be used to perform the various techniques and methods described herein.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 3:
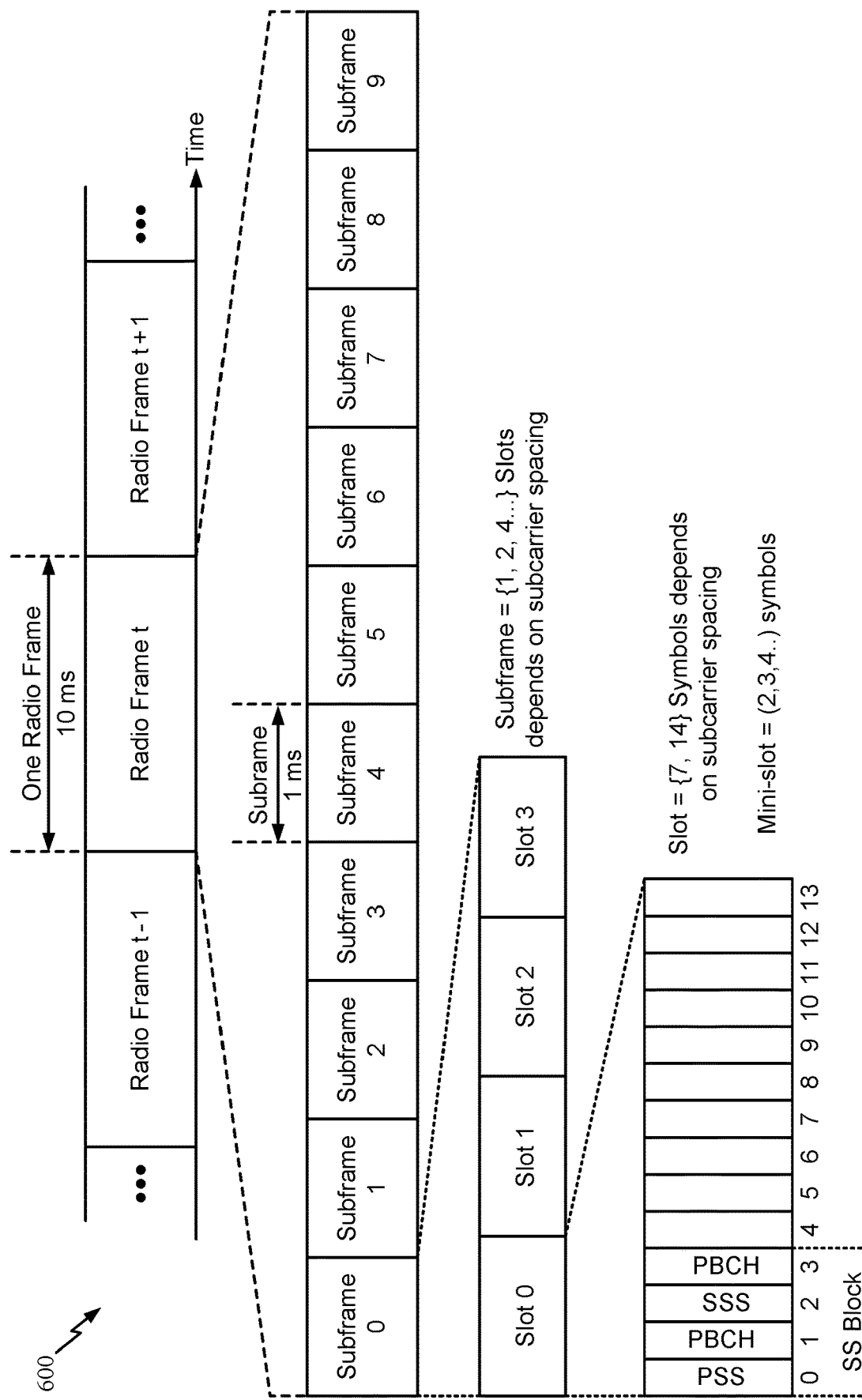
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example RACH Procedures

A random-access channel (RACH) is so named because it refers to a wireless channel (medium) that may be shared by multiple UEs and used by the UEs to (randomly) access the network for communications. For example, the RACH may be used for call setup and to access the network for data transmissions. In some cases, RACH may be used for initial access to a network when the UE switches from a radio resource control (RRC) connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network.

Figure 4:
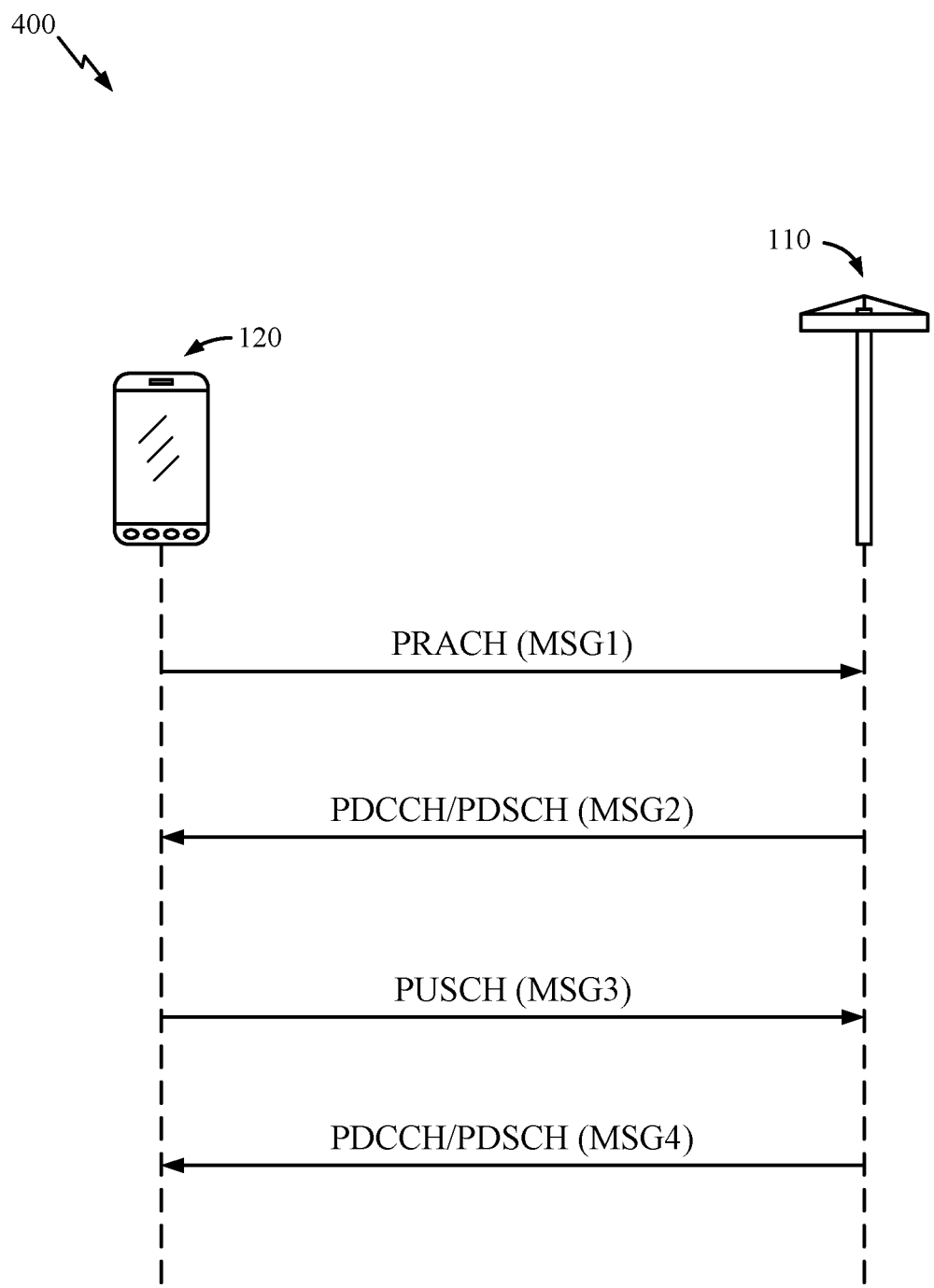
FIG. 4 is a timing diagram illustrating an example four-step RACH procedure, in accordance with certain aspects of the present disclosure.

FIG. 4 is a timing (or "call-flow") diagram 400 illustrating an example four-step RACH procedure, in accordance with certain aspects of the present disclosure. A first message (MSG1) may be sent from the UE 120 to BS 110 on the physical random access channel (PRACH). In this case, MSG1 may only include a RACH preamble. BS 110 may respond with a random access response (RAR) message (MSG2) which may include the identifier (ID) of the RACH preamble, a timing advance (TA), an uplink grant, cell radio network temporary identifier (C-RNTI), and a back off indicator. MSG2 may include a PDCCH communication including control information for a following communication on the PDSCH, as illustrated. In response to MSG2, MSG3 is transmitted from the UE 120 to BS 110 on the PUSCH. MSG3 may include one or more of a RRC connection request, a tracking area update request, a system information request, a positioning fix or positioning signal request, or a scheduling request. The BS 110 then responds with MSG 4 which may include a contention resolution message.

In some cases, to speed access, a two-step RACH procedure may be supported. As the name implies, the two-step RACH procedure may effectively "collapse" the four messages of the four-step RACH procedure into two messages.

Figure 5:
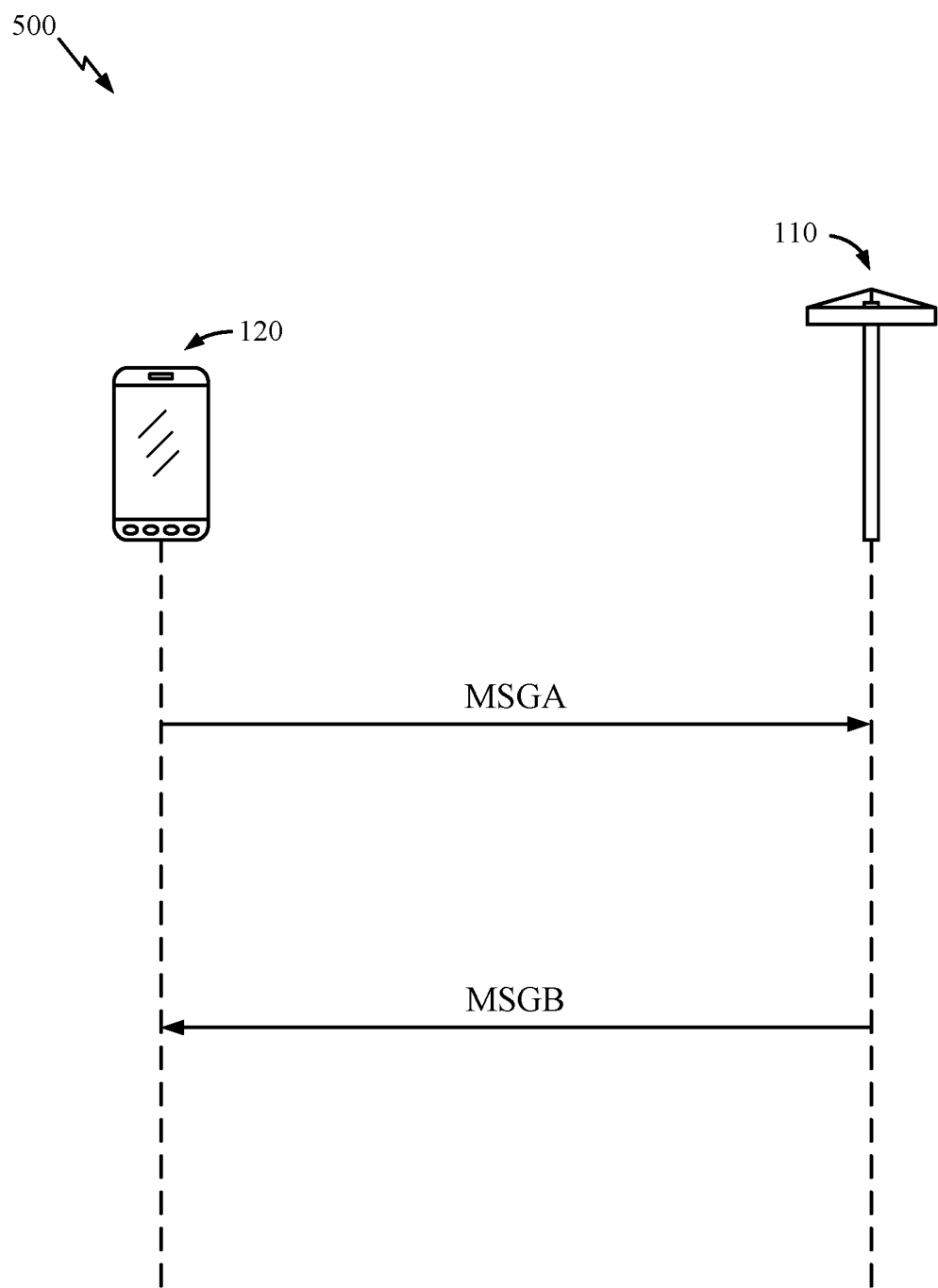
FIG. 5 is a timing diagram illustrating an example two-step RACH procedure, in accordance with certain aspects of the present disclosure.

FIG. 5 is a timing diagram 500 illustrating an example two-step RACH procedure, in accordance with certain aspects of the present disclosure. A first enhanced message (msgA) may be sent from the UE 120 to BS 110. In certain aspects, msgA includes some or all the information from MSG1 and MSG3 from the four-step RACH procedure, effectively combining MSG1 and MSG3. For example, msgA may include MSG1 and MSG3 multiplexed together such as using one of time-division multiplexing or frequency-division multiplexing. In certain aspects, msgA includes a RACH preamble for random access and a payload. The msgA payload, for example, may include the UE-ID and other signaling information (e.g., buffer status report (BSR)) or scheduling request (SR). BS 110 may respond with a random access response (RAR) message (msgB) which may effectively combine MSG2 and MSG4 described above. For example, msgB may include the ID of the RACH preamble, a timing advance (TA), a back off indicator, a contention resolution message, UL/DL grant, and transmit power control (TPC) commands.

In a two-step RACH procedure, the msgA may include a RACH preamble and a payload. In some cases, the RACH preamble and payload may be sent in a msgA transmission occasion.

The random access message (msgA) transmission occasion includes a msgA preamble occasion (for transmitting a preamble signal) and a msgA payload occasion for transmitting a PUSCH. The msgA preamble transmission involves:

(1) selection of a preamble sequence; and
(2) selection of a preamble occasion in time/frequency domain (for transmitting the selected preamble sequence).

The msgA payload transmission involves:

(1) construction of the random access message payload (DMRS/PUSCH); and
(2) selection of one or multiple PUSCH resource units (PRUs) in time/frequency domain to transmit this message (payload).

In some cases, a UE monitors SSB transmissions which are sent (by a gNB using different beams) and are associated with a finite set of time/frequency resources defining RACH occasions (ROs) and PRUs. As will be described in greater detail below, upon detecting an SSB, the UE may select an RO and one or more PRUs associated with that SSB for a msgA transmission. The finite set of ROs and PRUs may help reduce monitoring overhead (e.g., the processing associated with performing blind decoding) by a base station.

A two-step RACH procedure is sometimes chosen over a four-step RACH procedure due to certain characteristics, such as speed of access and the ability to send a relatively small amount of data without the overhead of a full four-step RACH procedure to establish a connection (when the four-step RACH messages may be larger than the payload). For example, in an industrial internet of things (I-IoT), a reduced capability (RedCap) UE (such as that shown in FIG. 6) may perform a two-step RACH procedure in order to send a small amount of sensor data.

The two-step RACH procedure can operate in any RRC state and any supported cell size. Networks that uses two-step RACH procedures can support contention-based random access (CBRA) transmission of messages (e.g., msgA) within a finite range of payload sizes and with a finite number of MCS levels.

Various technologies may be the focus of current wireless communication standards. For example, Rel-15 and/or Rel-16 may focus on premium smartphones (e.g., enhanced mobile broadband (eMBB)), and other verticals such as ultra-reliable low latency communication (URLLC) and/or vehicle-to-everything (V2X) communications. In some wireless communication standards (e.g., Rel-17 and beyond) there may exists a strong desire for new radio (NR) to be scalable and deployable in a more efficient and cost-effective way. Thus, a new UE type with reduced capabilities (RedCap) has been introduced. In particular, a RedCap UE may exhibit a relaxation of peak throughput, as well as lower latency and/or reliability requirements.

Figure 6:
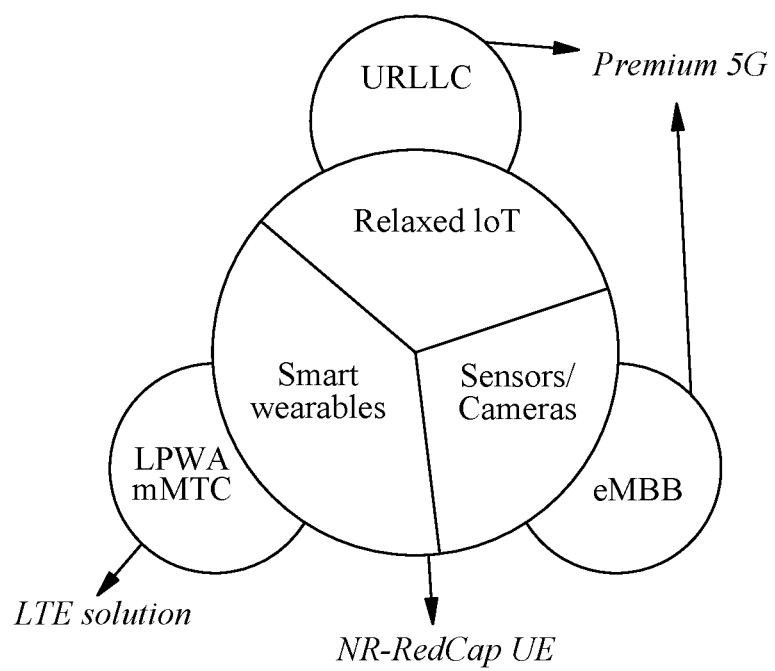
FIG. 6 is a diagram illustrating example functionality of reduced capability (RedCap) UEs, in accordance with certain aspects of the present disclosure.

Thus, some design objectives of the NR RedCap UE may include scalable resource allocation, coverage enhancement for DL and/or UL, power saving in all RRC states, and/or co-existence with the NR premium UE. As shown in FIG. 6, an NR-RedCap UE may be a smart wearable device, a sensor/camera, or any other device configured for relaxed internet-of-things (IoT) communications. Further, a RedCap UE functionality and/or capability may overlap with those of long term evolution (LTE) and/or fifth generation (5G) devices (e.g., premium 5G devices). For example, the functionality of relaxed IoT devices may overlap with that of URLLC devices, the functionality of smart wearable devices may overlap with that of low power wide area (LPWA) massive machine type communication (mMTC) devices, and/or the functionality of sensors/cameras may overlap with that of eMBB devices.

Example SRS after Msg 4 of RACH Procedure

Aspects of the present disclosure provide techniques for transmitting sounding reference signals (SRS) with (e.g., before or after) a random access channel (RACH) acknowledgement (ACK) after a Msg 4 of a RACH procedure. For example, the SRS may be indicated by a Msg2, Msg4, and/or a Msg4 physical downlink control channel for a 4-step RACH procedure (such as that shown in FIG. 4).

As noted above, supporting SRS transmissions at this early stage, prior to radio resource control (RRC) connection establishment, may enhance performance and overall user experience. For example, SRS transmissions during the RACH procedure may help a gNB perform uplink timing tracking, beam management, and/or perform link adaptation, leading to enhanced throughput sooner once RRC connection is established.

The techniques presented herein may be applied in various bands utilized for NR.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band Physical RACH (PRACH), Msg2 physical downlink control channel (PDCCH), and Msg3 physical uplink shared channel (PUSCH) messages may experience coverage issues. This may be especially true for FR2, due to sensitivity to directionality in this frequency range. In some implementations, beam refinement is a possible approach to improve the received signal power (e.g., by having more beamforming gain for the beam). Beam refinement can be done at the gNB or UE for transmission or reception.

Various methods for beam refinement at the gNB (e.g., based on reception of multiple copies of an uplink (UL) signal via different refined beams) have been proposed. For example, for reception of multiple copies of one PRACH via different refined beams, a refined beam for transmission of Msg2 PDCCH (and Msg2) and reception of Msg3 may be selected. In some cases, channel state information (CSI) reference signals (RS) (or other RSs) may be scheduled by a remaining system information (RMSI) PDCCH to help in UE-side beam refinement. In some cases, transmitting a frontloaded preamble or RS together with transmission of Msg3 PUSCH may also help with beam refinement.

In new radio (NR), SRS is used for uplink (UL) sounding. In such cases, SRS can be used to improve both UL reception and/or DL precoding. A given SRS resource can be configured as aperiodic, periodic, or semi-persistent. Periodic resources are configured with a slot-level periodicity and/or a slot-offset. Semi-persistent resources are configured with a slot-level periodicity and/or a slot-offset.

In some cases, the semi-persistent resources may be activated/deactivated by a media access control (MAC) control element (CE), and multiple SRS resources can be activated/deactivated with a single message. Aperiodic resources are configured without a slot-level periodicity and slot offset. For aperiodic resources, downlink control information (DCI) (e.g., scheduling downlink (DL) and/or UL) contains an SRS request field (e.g., 2-bits). In some cases, a group common (GC) DCI can be used to trigger an aperiodic SRS resource set.

Furthermore, aperiodic SRS resource(s) may be triggered on a per-set basis by DCI, and multiple SRS resources can be triggered with a single DCI message. Moreover, a codepoint of the SRS request field in DCI can be mapped to one or more SRS resource sets, and one state of the field that can be used to select at least one out of the configured SRS resources. It should be noted that for periodic/semi-persistent, different resources may have different periodicities and/or slot offsets.

In some cases, a UE can be configured with one or more (e.g., K≥1) SRS resources where a given X-port SRS resource spans N=1, 2, or 4 adjacent symbols within a slot (e.g., all X ports are mapped to each symbol of the resource) and/or $C_{SRS}$ and $B_{SRS}$ (for controlling bandwidth allocated to SRS) are configurable in a UE-specific way. For slot periodicity, various numbers of slots (e.g., 1, 2, 5, 10, 20, 40, 80, 160, 320, 640, 1280, or 2560 slots) can be supported for all various SCSs.

Additionally, NR supports configuration of an X-port (e.g., X≤4) SRS resource spanning N (e.g., N=1, 2, or 4) adjacent orthogonal frequency division multiplexing (OFDM) symbols within the same slot. In some cases, a gNB would configure SRS resource in the time domain only by UE-specific parameters (e.g., by SRS-SlotConfig, SRS-ResourceMapping).

When repetition only is configured, the X ports are mapped to each symbol of the resource and within the resource, and each of the X ports are mapped to the same set of subcarriers in the same set of physical resource blocks (PRBs) in the N SRS symbols. When only frequency hopping only is configured, the X ports are mapped to potentially different sets of subcarriers in each OFDM symbol of the resource (e.g., depending on a frequency hopping pattern).

Aspects of the present disclosure, however, provide for further coverage enhancement for RACH messages via beam refinement and/or enhanced CSI based on SRS transmissions during the RACH procedure. SRS configuration may occur via RRC signaling, in which case SRS transmissions begin after an RRC connection is established. Certain aspects of the present disclosure, however, provide for a UE to transmit SRS prior to RRC connection. For example, a UE may be configured to transmit SRS with (e.g., before or after) a RACH ACK after receiving a downlink RACH message (e.g., Msg 4). In one example, the UE may receive an indication (e.g., via Msg 2, Msg 4, and/or a Msg4 PDCCH) of the SRS. In another example, the UE may also determine resources for the SRS based on resources of the RACH ACK message.

Figure 7:
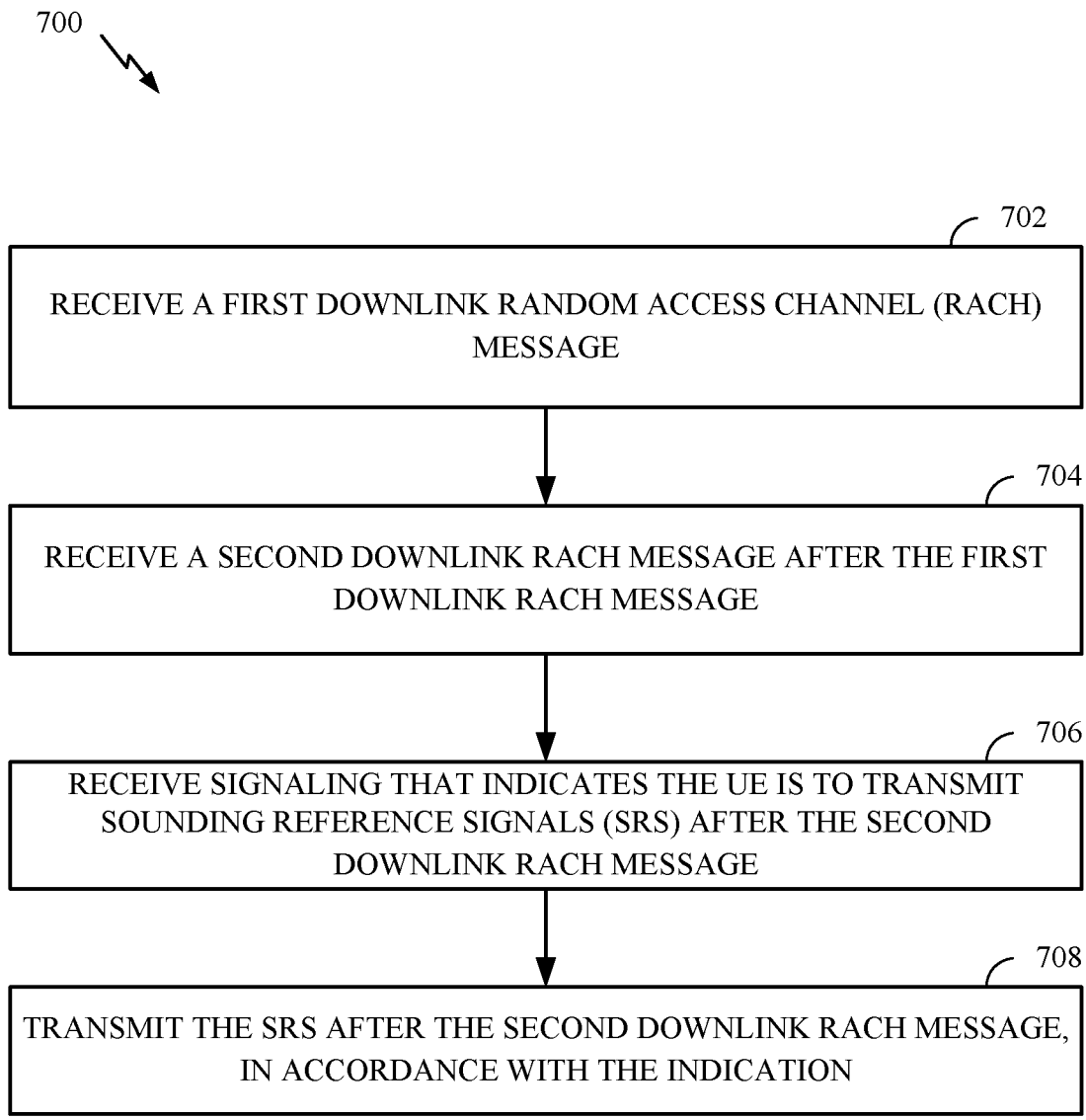
FIG. 7 illustrates example operations for wireless communication by a UE, in accordance with certain aspects of the present disclosure.

FIG. 7 illustrates example operations 700 for wireless communication, in accordance with certain aspects of the present disclosure. The operations 700 may be performed, for example, by a UE (e.g., such as a UE 120a in the wireless communication network 100) to transmit SRS (e.g., after Msg 4).

Operations 700 begin, at 702, by receiving a first downlink RACH message.

At 704, the UE receives a second downlink RACH message after the first downlink RACH message.

At 706, the UE receives signaling that indicates the UE is to transmit SRS after the second downlink RACH message.

Figure 10:
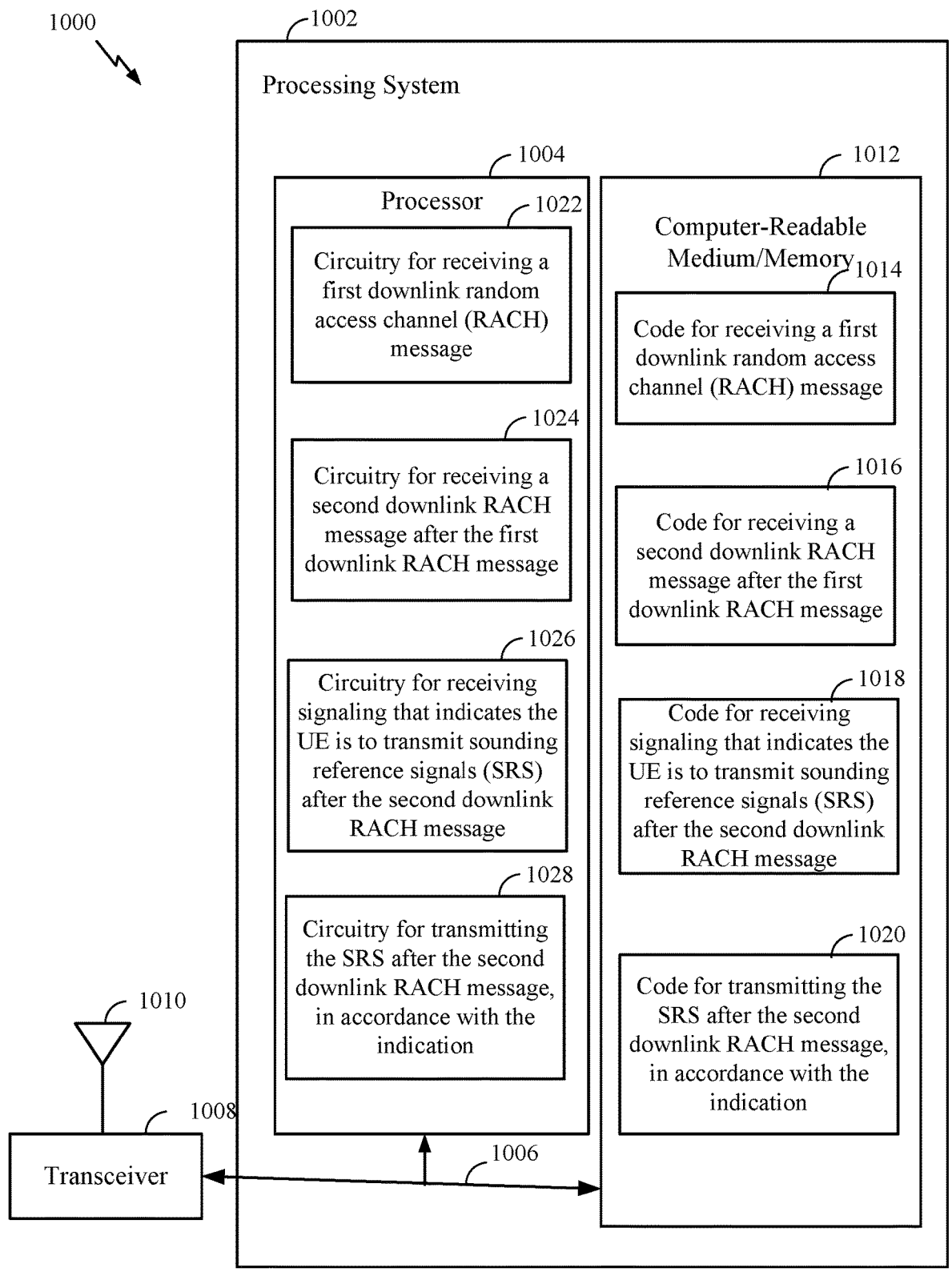
FIG. 10 illustrates a communications device that may include various components configured to perform operations for the techniques disclosed herein in accordance with aspects of the present disclosure.

For example, the UE may receive the first downlink RACH message, second downlink RACH message, and the signaling that indicates the UE is to transmit SRS via the antenna(s) and receiver/transceiver components of a UE 104 shown in FIG. 2 and/or of the apparatus shown in FIG. 10.

At 708, the UE transmits the SRS after the second downlink RACH message, in accordance with the indication. For example, the UE may transmit the SRS via the antenna(s) and receiver/transceiver components of a UE 104 shown in FIG. 2 and/or of the apparatus shown in FIG. 10.

Figure 8:
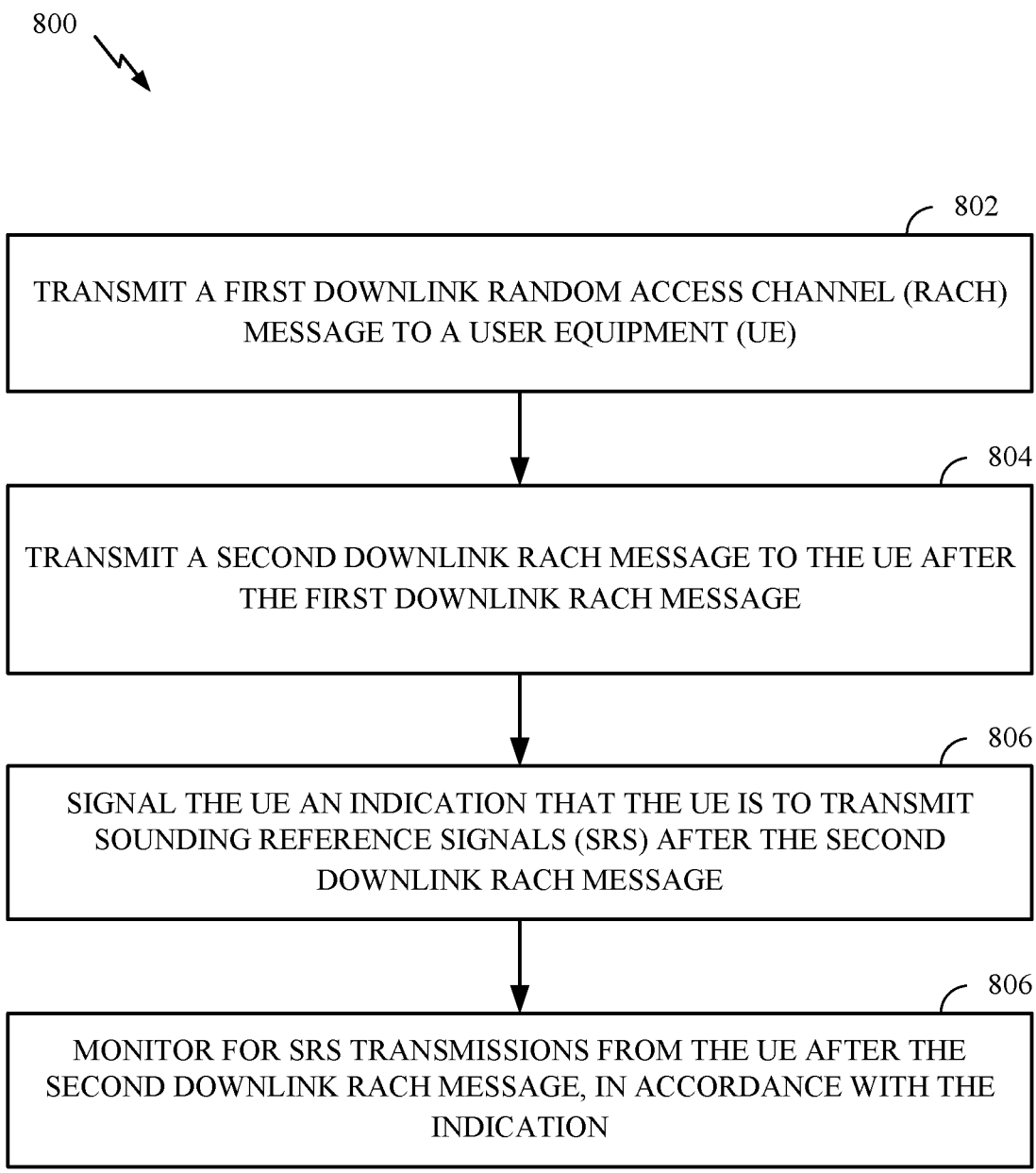
FIG. 8 illustrates example operations for wireless communication by a network entity, in accordance with certain aspects of the present disclosure.

FIG. 8 illustrates example operations 800 for wireless communication by a network entity and may be considered complementary to operations 700 of FIG. 7. For example, operations 800 may be performed by a BS 110 to configure a UE performing operations 800 of FIG. 8 with resources to transmit SRS (e.g., after Msg 4).

Operations 800 begin, at 802, by transmitting a first downlink RACH message to a UE.

At 804, the network entity transmits a second downlink RACH message to the UE after the first downlink RACH message.

At 806, the network entity signals the UE an indication that the UE is to transmit SRS after the second downlink RACH message.

Figure 11:
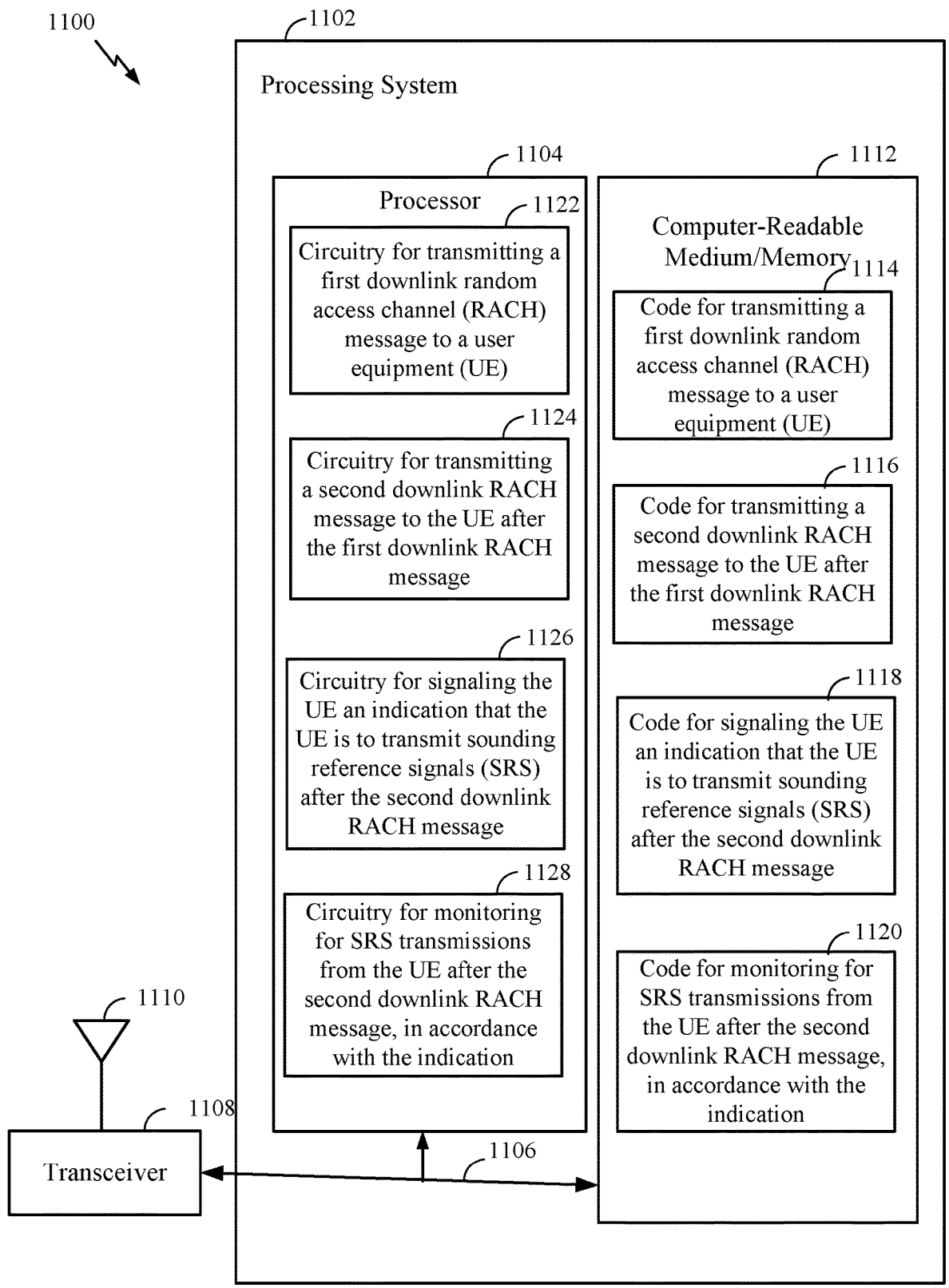
FIG. 11 illustrates a communications device that may include various components configured to perform operations for the techniques disclosed herein in accordance with aspects of the present disclosure.

For example, the network entity may transmit the first downlink RACH message, second downlink RACH message, and the signaling that indicates the UE is to transmit SRS via the antenna(s) and receiver/transceiver components of a BS 102 shown in FIG. 2 and/or of the apparatus shown in FIG. 11.

At 808, the network entity monitors for SRS transmissions from the UE after the second downlink RACH message, in accordance with the indication. For example, the network entity may monitor for the SRS via the antenna(s) and receiver/transceiver components of a BS 102 shown in FIG. 2 and/or of the apparatus shown in FIG. 11.

Figure 9:
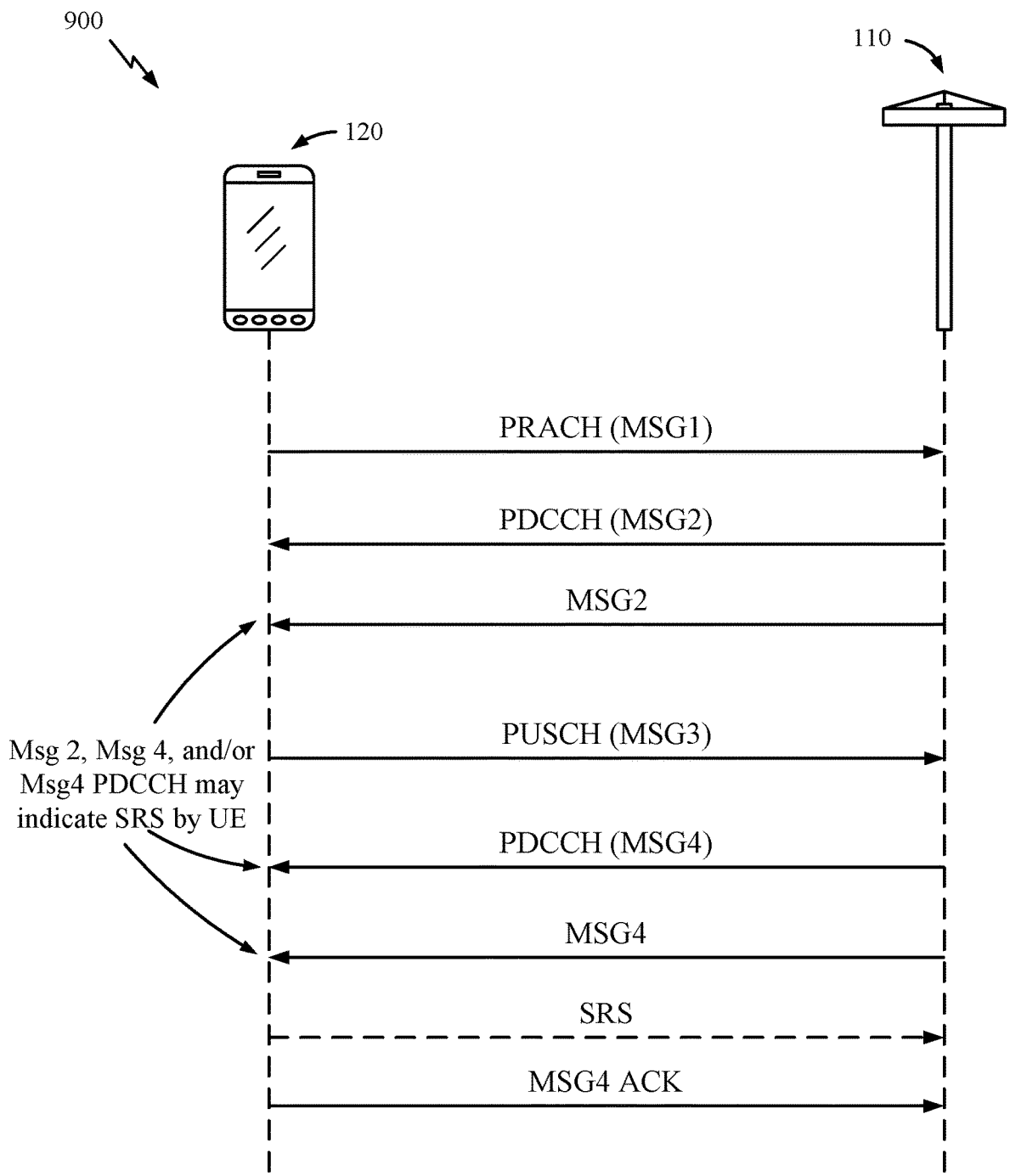
FIG. 9 illustrates an example RACH procedure with a sounding reference signal (SRS) transmission, in accordance with certain aspects of the present disclosure.

Operations 700 and 800 of FIGS. 7 and 8 may be understood with reference to the call flow diagram 900 of FIG. 9, which illustrates an example of how SRS may be triggered in a four-step RACH procedure. In certain aspects, the UE 120 may transmit SRS after receiving Msg 4 and, for example, before or after a Msg 4 ACK message.

As shown, Msg 2, Msg 4, and/or Msg 4 PDCCH may trigger the UE 120 to send SRS. For example, Msg 2, Msg 4, and/or Msg 4 PDCCH may include an indication (e.g., an SRS grant) for the UE 120 to transmit the SRS. Thus, as shown, after Msg4, the UE 120 transmits SRS with (e.g., before or after) a Msg 4 ACK message. As illustrated, the SRS is sent after the reception of Msg 4 and before the Msg 4 ACK. While not illustrated, in some cases, the SRS may be sent after both the Msg 4 the Msg 4 ACK.

In certain aspects, the SRS transmission may be performed in accordance with configuration parameters. For example, the configuration parameters for the SRS transmission may be predefined in standard specification. In some cases, the configurations parameters may be indicated in the downlink message that indicates the UE is to transmit SRS. For example, the configuration parameters may be indicated in Msg2 and/or a MAC CE conveyed by Msg 4.

Resources for the SRS may be determined by the UE in various manners. For example, the resources for SRS may be based on resources for the Msg 4 ACK. That is, the UE may determine the resources for the SRS such that the resources for the SRS are before or after the resources for the Msg 4 ACK. For example, the UE may decode Msg 4 to ascertain the resources for the Msg 4 ACK, and thus subsequently know which resources to use for the SRS transmission. As another example, the resources for the SRS transmissions may be determined according to rules specified in a standard specifications and/or additional parameters in a Msg4 MAC CE.

In certain aspects, if the resources indicated by a bit field in the Msg 4 or Msg 4 PDCCH, a certain number of bits of the bit field may indicate a number of predefined options or rules of a standard specification that a UE may use to determine the SRS resources. For example, 3 bits of the bit field may indicate up to 8 of predefined options or rules.

In some cases, an SRS bandwidth and/or the SRS frequency allocation may be indicated in Msg4 (e.g., a MAC CE conveyed by the Msg 4 and/or the Msg4 PDCCH (e.g., by a bit field in the Msg4 PDCCH). In certain aspects, the SRS may be indicated and/or determined to be a single transmission or the SRS could be transmitted with a given periodicity.

In some cases, the scheduling of the SRS transmissions may be valid/used until RRC connection is established. That is, for example, once RRC connection is established, the SRS transmission resources, parameters, and/or periodicity may be updated via RRC signaling.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 7, or other operations for performing the various techniques discussed herein. In certain aspects, computer-readable medium/memory 1012 stores code 1014 for receiving a first downlink RACH message; code 1016 for receiving a second downlink RACH message after the first downlink RACH message; code 1018 receiving signaling that indicates the UE is to transmit SRS after the second downlink RACH message; and code 1020 for transmitting the SRS after the second downlink RACH message, in accordance with the indication. In certain aspects, the processor 1004 has circuitry configured to implement the code stored in the computer-readable medium/memory 1012. The processor 1004 includes circuitry 1022 for receiving a first downlink RACH message; circuitry 1024 for receiving a second downlink RACH message after the first downlink RACH message; circuitry 1026 receiving signaling that indicates the UE is to transmit SRS after the second downlink RACH message; and circuitry 1028 for transmitting the SRS after the second downlink RACH message, in accordance with the indication.

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 8, or other operations for performing the various techniques discussed herein. In certain aspects, computer-readable medium/memory 1112 stores code 1114 for transmitting a first downlink RACH message to a UE; code 1116 for transmitting a second downlink RACH message to the UE after the first downlink RACH message; code 1118 for signaling the UE an indication that the UE is to transmit SRS after the second downlink RACH message; and code 1120 for monitoring for SRS transmissions from the UE after the second downlink RACH message, in accordance with the indication. In certain aspects, the processor 1104 has circuitry configured to implement the code stored in the computer-readable medium/memory 1112. The processor 1104 includes circuitry 1122 for transmitting a first downlink RACH message to a UE; circuitry 1124 for transmitting a second downlink RACH message to the UE after the first downlink RACH message; circuitry 1126 for signaling the UE an indication that the UE is to transmit SRS after the second downlink RACH message; and circuitry 1128 for monitoring for SRS transmissions from the UE after the second downlink RACH message, in accordance with the indication.

Example Aspects

Aspect 1: A method for wireless communications performed by a user equipment (UE), comprising receiving a first downlink random access channel (RACH) message, receiving a second downlink RACH message after the first downlink RACH message, receiving signaling that indicates the UE is to transmit sounding reference signals (SRS) after the second downlink RACH message, and transmitting the SRS after the second downlink RACH message, in accordance with the indication.

Aspect 2: The method of Aspect 1, wherein the indication is provided in the first downlink RACH message.

Aspect 3: The method of Aspect 1 or 2, wherein the indication is provided in the second downlink RACH message or a physical downlink control channel (PDCCH) for the second RACH message.

Aspect 4: The method of any of Aspects 1-3, wherein the SRS is transmitted in accordance with one or more predefined configuration parameters.

Aspect 5: The method of any of Aspects 1-4, wherein the SRS is transmitted in accordance with one or more configuration parameters that are indicated in the first downlink RACH message.

Aspect 6: The method of any of Aspects 1-5, wherein the SRS is transmitted in accordance with one or more configuration parameters that are indicated in a medium access control (MAC) control element (CE) conveyed by the second downlink RACH message.

Aspect 7: The method of any of Aspects 1-6, wherein the SRS is transmitted on a first set of resources based on a second set of resources used by the UE for transmitting an acknowledgment of the second downlink RACH message.

Aspect 8: The method of any of Aspects 1-7, wherein the SRS is transmitted on a set of resources based on one or more rules.

Aspect 9: The method of any of Aspects 1-8, wherein the SRS is transmitted on a set of resources based on one or more parameters indicated in a MAC CE conveyed by the second downlink RACH message.

Aspect 10: The method of any of Aspects 1-9, wherein the SRS is transmitted on frequency resources indicated in the second downlink RACH message or a PDCCH for the second RACH message.

Aspect 11: The method of Aspect 10, wherein the frequency resources comprise at least one of an SRS bandwidth or a frequency allocation within SRS bandwidth.

Aspect 12: The method of Aspect 10 or 11, wherein frequency resources are indicated in a MAC CE conveyed by the second downlink RACH message or a bit field in the PDCCH for the second RACH message.

Aspect 13: A method for wireless communications performed by a network entity, comprising transmitting a first downlink RACH message to a UE, transmitting a second downlink RACH message to the UE after the first downlink RACH message, signaling the UE an indication that the UE is to transmit SRS after the second downlink RACH message, and monitoring for SRS transmissions from the UE after the second downlink RACH message, in accordance with the indication.

Aspect 14: The method of Aspect 13, wherein the indication is provided in the first downlink RACH message.

Aspect 15: The method of Aspect 13 or 14, wherein the indication is signaled in the second downlink RACH message or a PDCCH for the second RACH message.

Aspect 16: The method of any of Aspects 13-15, wherein the network entity monitors for the SRS in accordance with one or more predefined configuration parameters.

Aspect 17: The method of any of Aspects 13-16, wherein the network entity monitors for the SRS in accordance with one or more configuration parameters that are indicated in the first downlink RACH message.

Aspect 18: The method of any of Aspects 13-17, wherein the network entity monitors for the SRS in accordance with one or more configuration parameters that are indicated in a MAC CE conveyed by the second downlink RACH message.

Aspect 19: The method of any of Aspects 13-18, wherein the network entity monitors for the SRS on a first set of resources based on a second set of resources used by the UE for transmitting an acknowledgment of the second downlink RACH message.

Aspect 20: The method of any of Aspects 13-19, wherein the network entity monitors for the SRS on a set of resources based on one or more rules.

Aspect 21: The method of any of Aspects 13-20, wherein the network entity monitors for the SRS on a set of resources based on one or more parameters indicated in a MAC CE conveyed by the second downlink RACH message.

Aspect 22: The method of any of Aspects 13-21, wherein the network entity monitors for the SRS on frequency resources indicated in the second downlink RACH message or a PDCCH for the second RACH message.

Aspect 23: The method of Aspect 22, wherein the frequency resources comprise at least one of an SRS bandwidth or a frequency allocation within SRS bandwidth.

Aspect 24: The method of Aspect 22 or 23, wherein the network entity indicates the frequency resources in a MAC CE conveyed by the second downlink RACH message or a bit field in the PDCCH for the second RACH message.

Aspect 25: An apparatus for wireless communication, comprising a memory and at least one processor coupled to the memory, the memory and the at least one processor being configured to perform one or more of the operations of Aspects 1-24.

Aspect 26: An apparatus for wireless communication, comprising means for performing one or more of the operations of Aspects 1-24.

Aspect 27: A computer readable medium having instructions stored thereon for performing one or more of the operations of Aspects 1-24.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. Modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations and techniques described herein and illustrated in FIGS. 7-8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method for wireless communications performed by a user equipment (UE), comprising:
  receiving a first downlink random access channel (RACH) message;
  receiving a second downlink RACH message after the first downlink RACH message;
  receiving signaling that indicates the UE is to transmit sounding reference signals (SRS) after the second downlink RACH message; and
  transmitting the SRS after the second downlink RACH message, in accordance with the indication, wherein:
    the SRS is transmitted on frequency resources indicated in a physical downlink control channel (PDCCH) for the second downlink RACH message; and
    the frequency resources comprise at least one of an SRS bandwidth or a frequency allocation within an SRS bandwidth.

2. The method of claim 1, wherein the indication the UE is to transmit SRS after the second downlink RACH message is provided in the first downlink RACH message.

3. The method of claim 1, wherein the indication the UE is to transmit SRS after the second downlink RACH message is provided in the second downlink RACH message or the PDCCH for the second downlink RACH message.

4. The method of claim 1, wherein the SRS is transmitted in accordance with one or more predefined configuration parameters.

5. The method of claim 1, wherein the SRS is transmitted on a set of resources based on one or more rules.

6. A method for wireless communications performed by a user equipment (UE), comprising:
  receiving a first downlink random access channel (RACH) message;
  receiving a second downlink RACH message after the first downlink RACH message;
  receiving signaling that indicates the UE is to transmit sounding reference signals (SRS) after the second downlink RACH message; and
  transmitting the SRS after the second downlink RACH message, in accordance with the indication, wherein at least one of:
    the SRS is transmitted in accordance with one or more configuration parameters that are indicated in a medium access control (MAC) control element (CE) conveyed by the second downlink RACH message;
    the SRS is transmitted on a first set of resources based on a second set of resources used by the UE for transmitting an acknowledgment of the second downlink RACH message;
    the SRS is transmitted on a set of resources based on one or more parameters indicated in a MAC-CE conveyed by the second downlink RACH message;
    the SRS is transmitted on frequency resources that are indicated in a MAC-CE conveyed by the second downlink RACH message; or
    the SRS is transmitted on frequency resources that are indicated in a bit field in a physical downlink control channel (PDCCH) for the second downlink RACH message.

7. A method for wireless communications performed by a network entity, comprising:
  transmitting a first downlink random access channel (RACH) message to a user equipment (UE);
  transmitting a second downlink RACH message to the UE after the first downlink RACH message;
  signaling the UE an indication that the UE is to transmit sounding reference signals (SRS) after the second downlink RACH message; and
  monitoring for SRS transmissions from the UE after the second downlink RACH message, in accordance with the indication, wherein:
    the monitoring comprises monitoring on frequency resources indicated in a physical downlink control channel (PDCCH) for the second downlink RACH message; and
    the frequency resources comprise at least one of an SRS bandwidth or a frequency allocation within an SRS bandwidth.

8. The method of claim 7, wherein the indication the UE is to transmit SRS after the second downlink RACH message is provided in the first downlink RACH message.

9. The method of claim 7, wherein the indication the UE is to transmit SRS after the second downlink RACH message is signaled in the second downlink RACH message or the PDCCH for the second downlink RACH message.

10. The method of claim 7, wherein the network entity monitors for the SRS in accordance with one or more predefined configuration parameters.

11. The method of claim 7, wherein the network entity monitors for the SRS on a set of resources based on one or more rules.

12. A method for wireless communications performed by a network entity, comprising:
  transmitting a first downlink random access channel (RACH) message to a user equipment (UE);

transmitting a second downlink RACH message to the UE after the first downlink RACH message;
signaling the UE an indication that the UE is to transmit sounding reference signals (SRS) after the second downlink RACH message; and
monitoring for SRS transmissions from the UE after the second downlink RACH message, in accordance with the indication, wherein at least one of:
the network entity monitors for the SRS in accordance with one or more configuration parameters that are indicated in a medium access control (MAC) control element (CE) conveyed by the second downlink RACH message;
the network entity monitors for the SRS on a first set of resources based on a second set of resources used by the UE for transmitting an acknowledgment of the second downlink RACH message;
the network entity monitors for the SRS on a set of resources based on one or more parameters indicated in a MAC-CE conveyed by the second downlink RACH message;
the network entity monitors for the SRS on frequency resources indicated in a MAC-CE conveyed by the second downlink RACH message; or
the network entity monitors for the SRS on frequency resources indicated in a bit field in a physical downlink control channel (PDCCH) for the second RACH message.

13. A user equipment (UE) configured for wireless communication, comprising:
a memory comprising computer-executable instructions; and
a processor configured to execute the computer-executable instructions and cause the UE to:
receive a first downlink random access channel (RACH) message;
receive a second downlink RACH message after the first downlink RACH message;
receive signaling that indicates the UE is to transmit sounding reference signals (SRS) after the second downlink RACH message; and
transmit the SRS after the second downlink RACH message, in accordance with the indication, wherein:
the SRS is transmitted on frequency resources indicated in a physical downlink control channel (PDCCH) for the second downlink RACH message; and
the frequency resources comprise at least one of an SRS bandwidth or a frequency allocation within an SRS bandwidth.

14. The UE of claim 13, wherein the indication the UE is to transmit SRS after the second downlink RACH message is provided in the first downlink RACH message.

15. The UE of claim 13, wherein the indication the UE is to transmit SRS after the second downlink RACH message is provided in the second downlink RACH message or the PDCCH for the second downlink RACH message.

16. A network entity configured for wireless communication, comprising:
a memory comprising computer-executable instructions; and
a processor configured to execute the computer-executable instructions and cause the network entity to:
transmit a first downlink random access channel (RACH) message to a user equipment (UE);
transmit a second downlink RACH message to the UE after the first downlink RACH message;
signal the UE an indication that the UE is to transmit sounding reference signals (SRS) after the second downlink RACH message; and
monitor for SRS transmissions from the UE after the second downlink RACH message, in accordance with the indication, wherein:
the monitoring comprises monitoring on frequency resources indicated in a physical downlink control channel (PDCCH) for the second downlink RACH message; and
the frequency resources comprise at least one of an SRS bandwidth or a frequency allocation within an SRS bandwidth.

17. The network entity of claim 16, wherein the indication the UE is to transmit SRS after the second downlink RACH message is provided in the first downlink RACH message.

18. The network entity of claim 16, wherein the indication the UE is to transmit SRS after the second downlink RACH message is signaled in the second downlink RACH message or the PDCCH for the second downlink RACH message.

19. A user equipment (UE) configured for wireless communication, comprising:
a memory comprising computer-executable instructions; and
a processor configured to execute the computer-executable instructions and cause the UE to:
receive a first downlink random access channel (RACH) message;
receive a second downlink RACH message after the first downlink RACH message;
receive signaling that indicates the UE is to transmit sounding reference signals (SRS) after the second downlink RACH message; and
transmit the SRS after the second downlink RACH message, in accordance with the indication, wherein at least one of:
the SRS is transmitted in accordance with one or more configuration parameters that are indicated in a medium access control (MAC) control element (CE) conveyed by the second downlink RACH message;
the SRS is transmitted on a first set of resources based on a second set of resources used by the UE for transmitting an acknowledgment of the second downlink RACH message;
the SRS is transmitted on a set of resources based on one or more parameters indicated in a MAC-CE conveyed by the second downlink RACH message;
the SRS is transmitted on frequency resources that are indicated in a MAC-CE conveyed by the second downlink RACH message; or
the SRS is transmitted on frequency resources that are indicated in a bit field in a physical downlink control channel (PDCCH) for the second downlink RACH message.

20. A network entity configured for wireless communication, comprising:
a memory comprising computer-executable instructions; and
a processor configured to execute the computer-executable instructions and cause the network entity to:
transmit a first downlink random access channel (RACH) message to a user equipment (UE);
transmit a second downlink RACH message to the UE after the first downlink RACH message;

signal the UE an indication that the UE is to transmit sounding reference signals (SRS) after the second downlink RACH message; and monitor for SRS transmissions from the UE after the second downlink RACH message, in accordance with the indication, wherein at least one of:

the network entity monitors for the SRS in accordance with one or more configuration parameters that are indicated in a medium access control (MAC) control element (CE) conveyed by the second downlink RACH message;

the network entity monitors for the SRS on a first set of resources based on a second set of resources used by the UE for transmitting an acknowledgment of the second downlink RACH message;

the network entity monitors for the SRS on a set of resources based on one or more parameters indicated in a MAC-CE conveyed by the second downlink RACH message;

the network entity monitors for the SRS on frequency resources indicated in a MAC-CE conveyed by the second downlink RACH message; or the network entity monitors for the SRS on frequency resources indicated in a bit field in a physical downlink control channel (PDCCH) for the second RACH message.

* * * * *